US006763796B2

(12) United States Patent
Suzuki et al.

(10) Patent No.: US 6,763,796 B2
(45) Date of Patent: Jul. 20, 2004

(54) INTERNAL COMBUSTION ENGINE

(75) Inventors: Masatoshi Suzuki, Saitama (JP); Naoto Hara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 51 days.

(21) Appl. No.: 10/084,178

(22) Filed: Feb. 28, 2002

(65) Prior Publication Data

US 2002/0117144 A1 Aug. 29, 2002

(30) Foreign Application Priority Data

Feb. 28, 2001 (JP) ........................................ 2001-055135
May 30, 2001 (JP) ........................................ 2001-162436

(51) Int. Cl.[7] .................................................. F02F 7/00
(52) U.S. Cl. .................................................. 123/195 R
(58) Field of Search .......................... 123/197.1, 197.2, 123/197.4, 193.5, 658, 657, 196 R, 195 R, 195 AC, 197.3, 53.3, 53.5, 55.2, 55.5

(56) References Cited

U.S. PATENT DOCUMENTS 3,633,429 A    1/1972   Olson
5,167,208 A *  12/1992  Rasiah ................... 123/197.4
5,887,482 A *  3/1999   Yoshizawa ................ 74/44
6,062,187 A *  5/2000   Pattakos et al. ......... 123/197.1

FOREIGN PATENT DOCUMENTS

DE    634 293    8/1936
GB    214 613    1/1925

* cited by examiner

Primary Examiner—Tony M. Argenbright
Assistant Examiner—Hyder Ali
(74) Attorney, Agent, or Firm—Birch, Stewart, Kolasch & Birch, LLP

(57) ABSTRACT

To increase thermal efficiency by increasing the degree of constant volume of a fuel-air mixture at the time of combustion in an internal combustion engine. In an internal combustion engine, a piston slidably fitted in a cylinder is connected to a crankshaft via a connecting rod, and a cylinder head in which a combustion chamber is defined is disposed between the piston and the crankshaft. As compared with a background art internal combustion engine in which a combustion chamber is disposed opposite to a crankshaft with a piston located therebetween, a ratio of an increased amount of the volume of the combustion chamber to an increased amount of a crank angle of the piston from the top dead center position can be suppressed at a small value.

23 Claims, 9 Drawing Sheets

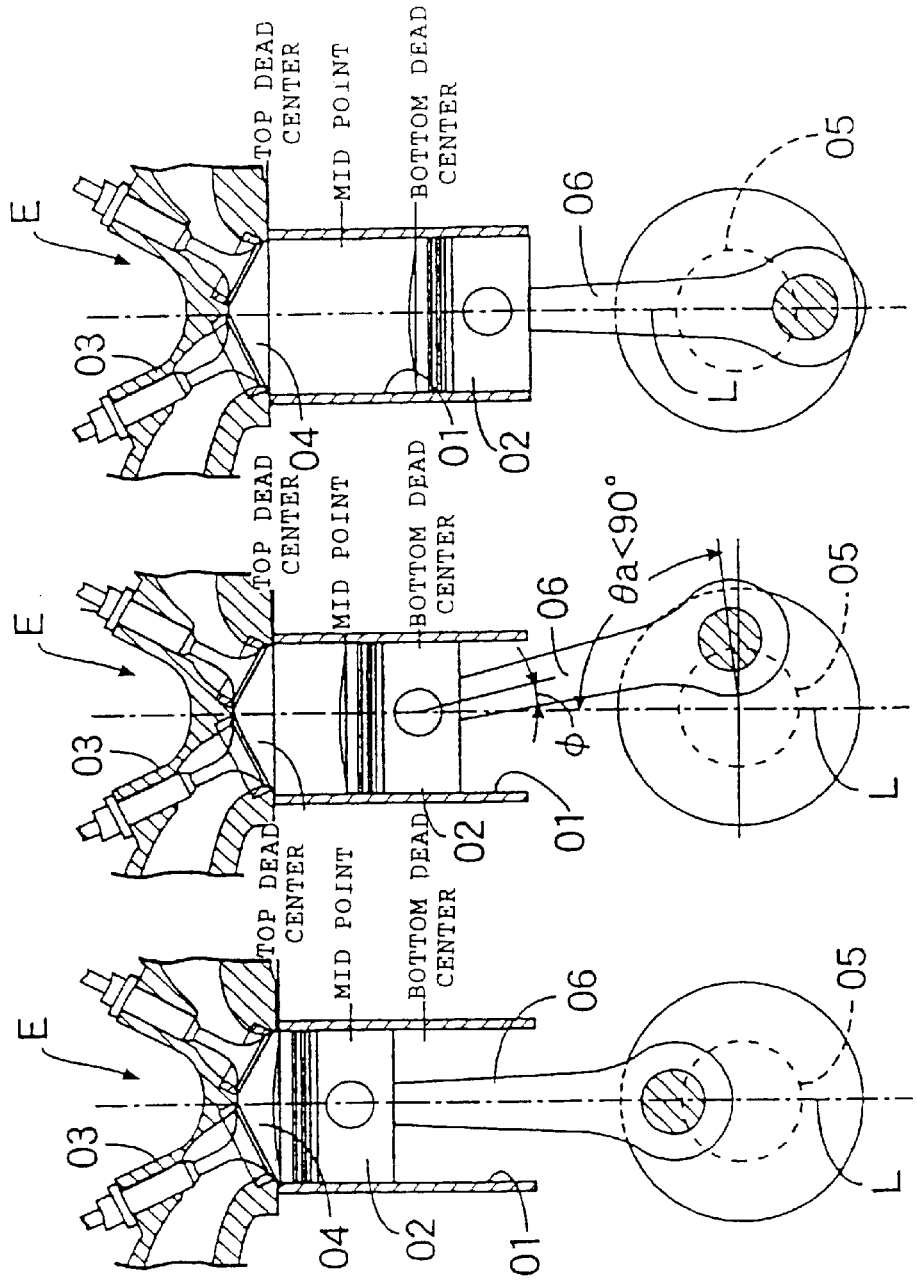

INTERNAL COMBUSTION ENGINE

CROSS-REFERENCE TO RELATED APPLICATIONS

This non-provisional application claims priority under 35 U.S.C. § 119(a) on Patent Application Nos. 2001-055135 and 2001-162436 filed in Japan on Feb. 28, 2001 and May 30, 2001, respectively, the entirety of which is herein incorporated by reference.

BACKGROUND OF THE INVENTION

1. Field of the Invention

The present invention relates to an internal combustion engine in which a piston slidably fitted in a cylinder is connected to a crankshaft via a connecting rod.

2. Description of Background Art

FIGS. 9(A) to 9(C) illustrate a background art four-cycle/single-cylinder internal combustion engine.

An internal combustion engine E includes a cylinder 01, a piston 02 slidably fitted in the cylinder 01, a cylinder head 03 connected to the cylinder 01, a combustion chamber 04 formed at a bottom plane of the cylinder head 03 in such a manner as to face to the cylinder 01, a crankshaft 05, and a connecting rod 06 for connecting the piston 02 to the crankshaft 05. The piston 02 is disposed at a position between the cylinder head 03 and the crankshaft 05.

FIG. 9(A) illustrates a state where the piston 02 is located at a top dead center position. In this state, a crank angle $\theta$ is 0°. FIG. 9(C) illustrates a state where the piston 02 is located at a bottom dead center position. In this state, the crank angle $\theta$ is 180°. FIG. 9(B) illustrates a state where the piston 02 is located at a mid point between the top dead center and the bottom dead center positions. In this state, the crank angle $\theta$ is not 90°, but an angle $\theta a$ smaller than 90°. The reason for this the fact that at each of the top dead center and the bottom dead center positions, the connecting rod 06 is located on a cylinder axial line L. However, at the mid point, the connecting rod 06 is inclined by an angle $\phi$ from the cylinder axial line L.

Referring to FIG. 8, a relationship between the crank angle $\theta$ from the top dead center position of the internal combustion engine E and a displacement x of the piston 02 from the top dead center position is shown by a chain line. In the figure, a stroke of the piston 02 between the top dead center and the bottom dead center positions is set to 2R (R: crank radius). As described with reference to FIG. 9(B), when the piston 02 is located at the mid point between the top dead center and the bottom dead center positions (at which a displacement x of the piston 02 is R), the crank angle $\theta$ becomes the angle $\theta a$ smaller than 90°. On the other hand, in a solid sine curve (x=R sin ($\theta$−90°)+R), when the piston 02 is located at the mid point between the top dead center and the bottom center, the crank angle $\theta$ becomes 90°.

In this way, according to the background art internal combustion engine E, it becomes apparent that the line (shown by the chain line) showing the relationship between the crank angle $\theta$ and the displacement x of the piston 02 is positioned over the solid sine curve. This means that when the piston 02 is moved down from the top dead center position at the initial stage of an expansion stroke, a ratio of an increased amount of the displacement x of the piston 02 to an increased amount of the crank angle $\theta$ is larger than the characteristic shown by the solid sine curve.

By the way, to increase thermal efficiency of the internal combustion engine E, it may be desirable to increase the degree of constant volume of a fuel-air mixture at the time of combustion. This will be more fully described below. When the piston 02 is located in the vicinity of the top dead center position, combustion of a fuel-air mixture starts, and as the piston 02 is moved down, a volume of the combustion chamber 04 over the piston 02 is increased. At this time, as a ratio of an increased amount of the volume of the combustion chamber 04 to an increased amount of the crank angle $\theta$ becomes smaller, the above-described degree of constant volume becomes higher, with a result that the thermal efficiency is improved. From this viewpoint, in the background art internal combustion engine E shown in FIGS. 9(A) to 9(C), the ratio of an increased amount of the volume of the combustion chamber 04 to an increased amount of the crank angle $\theta$ from the top dead center position becomes larger, so that the degree of constant volume becomes lower. This is inconvenient in terms of increasing the thermal efficiency of the internal combustion engine E.

SUMMARY OF THE INVENTION

In view of the foregoing, the present invention has been made, and an object of the present invention is to increase a thermal efficiency of an internal combustion engine by increasing the degree of constant volume of a fuel-air mixture at the time of combustion in the internal combustion engine.

To solve the above object, according to a first aspect of the present invention, there is provided an internal combustion engine in which a piston slidably fitted in a cylinder is connected to a crankshaft via a connecting rod, wherein a cylinder head in which a combustion chamber is defined is disposed between the piston and the crankshaft.

With this configuration, since a cylinder head in which a combustion chamber is defined is disposed between a piston and a crankshaft in an internal combustion engine, as compared with a background art internal combustion engine in which a combustion chamber is disposed opposite to a crankshaft with a piston located therebetween, a ratio of an increased amount of the volume of the combustion chamber to an increased amount of a crank angle of the piston from the top dead center position can be suppressed at a small value. As a result, it is possible to increase the degree of constant volume of a fuel-air mixture at the time of combustion and hence to increase thermal efficiency of the internal combustion engine. Furthermore, since a tensile load is applied to a connecting rod in an expansion stroke, it is not required to take buckling into account as compared with the background art internal combustion engine in which a compressive load is applied to a connecting rod. As a result, it is possible to lower a strength of the connecting rod and hence to reduce the weight thereof.

According to a second aspect of the present invention, in addition to the configuration of the first aspect of the present invention, an intake valve and an exhaust valve are provided in the cylinder head in such a manner as to be open in a V-shape, and a valve mechanism and the crankshaft are disposed between the intake valve and the exhaust valve.

With this configuration, since a valve mechanism and a crankshaft are disposed between an intake valve and an exhaust valve provided in a cylinder head in such a manner as to be opened in a V-shape, it is possible not only to simplify a power transmission route from the crankshaft to the valve mechanism by making the crankshaft and the valve mechanism closer to each other but also to lower the total height of the internal combustion engine.

According to a third aspect of the present invention, in addition to the configuration of the first aspect of the present invention, a pair of connecting rods are disposed on opposite axial end sides of the crankshaft in such a manner as to locate the piston therebetween.

With this configuration, since a pair of connecting rods are disposed on opposite axial end sides of a crankshaft in such a manner as to locate a piston therebetween, it is possible to prevent an unbalanced load from being applied to the piston while avoiding interference of the connecting rods with the piston.

According to a fourth aspect of the present invention, there is provided a reciprocating internal combustion engine in which a stroke volume is not changed during a cycle, wherein values of x, θ, and R satisfy an equation of x<R sin (θ−90°)+R, where x is a displacement of a piston moved toward a bottom dead center position from a top dead center position taken as a reference point, θ is a crank angle from the top dead center position, and R is a crank radius, With this configuration, a ratio of an increased amount of a volume of a combustion chamber to an increased amount of a crank angle can be suppressed at a small value. This makes it possible to increase the degree of constant volume of a fuel-air mixture at the time of combustion and hence to increase thermal efficiency.

According to fifth aspect of the present invention, in addition to the configuration of the fourth aspect of the present invention, a cylinder head in which a combustion chamber is defined is disposed between a piston and a crankshaft, and a distance between a lower end of a piston ring and an upper end of a piston pin is larger than a stroke of the piston.

With this configuration, since a cylinder head in which a combustion chamber is defined is disposed between a piston and a crankshaft, a tensile load is applied to a connecting rod. Accordingly, it is not required to take buckling into account as compared with the background art internal combustion engine in which a compressive load is applied to a connecting rod. As a result, it is possible to lower a strength of the connecting rod and hence to reduce the weight thereof. Furthermore, since a distance between a lower end of a piston ring and an upper end of a piston pin is set to be larger than a stoke of the piston, the piston ring is not removed from the lower end of the cylinder when the piston reaches the bottom dead center.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 9(A) to 9(C) are views illustrating a function of a background art internal combustion engine.

DETAILED DESCRIPTION OF THE PREFERRED EMBODIMENTS

Hereinafter, the present invention will be described with reference to the accompanying drawings in which an embodiment of the present invention is shown.

FIGS. 1 to 8 illustrate one embodiment of the present invention. In the following embodiment, an internal combustion engine E of the present invention is applied to a power unit P of a motorcycle.

Figure 1:
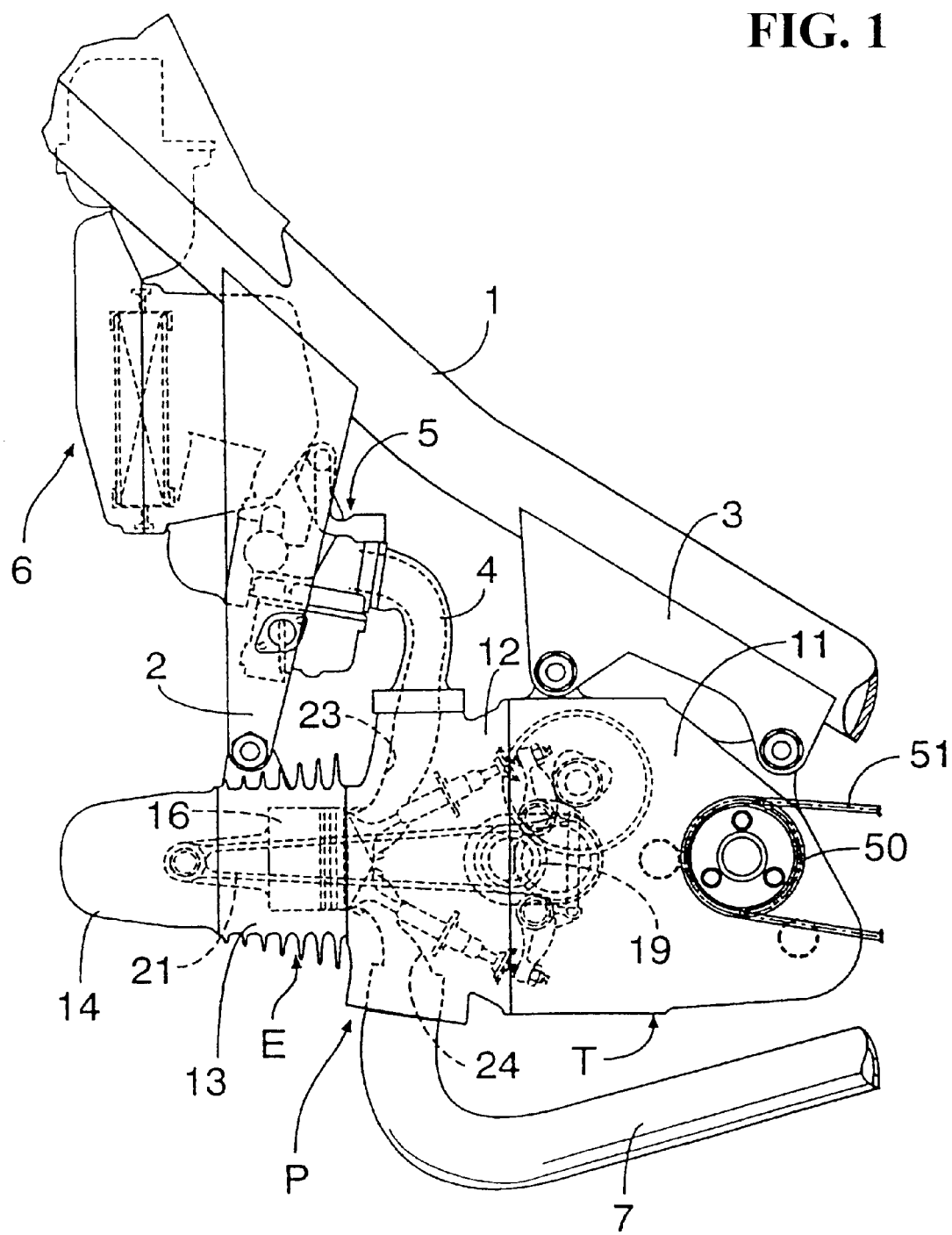
FIG. 1 is a view illustrating a state in which a power unit is mounted to a vehicular body of a motorcycle.

As shown in FIG. 1, a power unit P includes an internal combustion engine E and a transmission T integrated with the engine E. The power unit P is suspended from mounting brackets 2 and 3 provided on a body frame 1 of the motorcycle.

Figure 2:
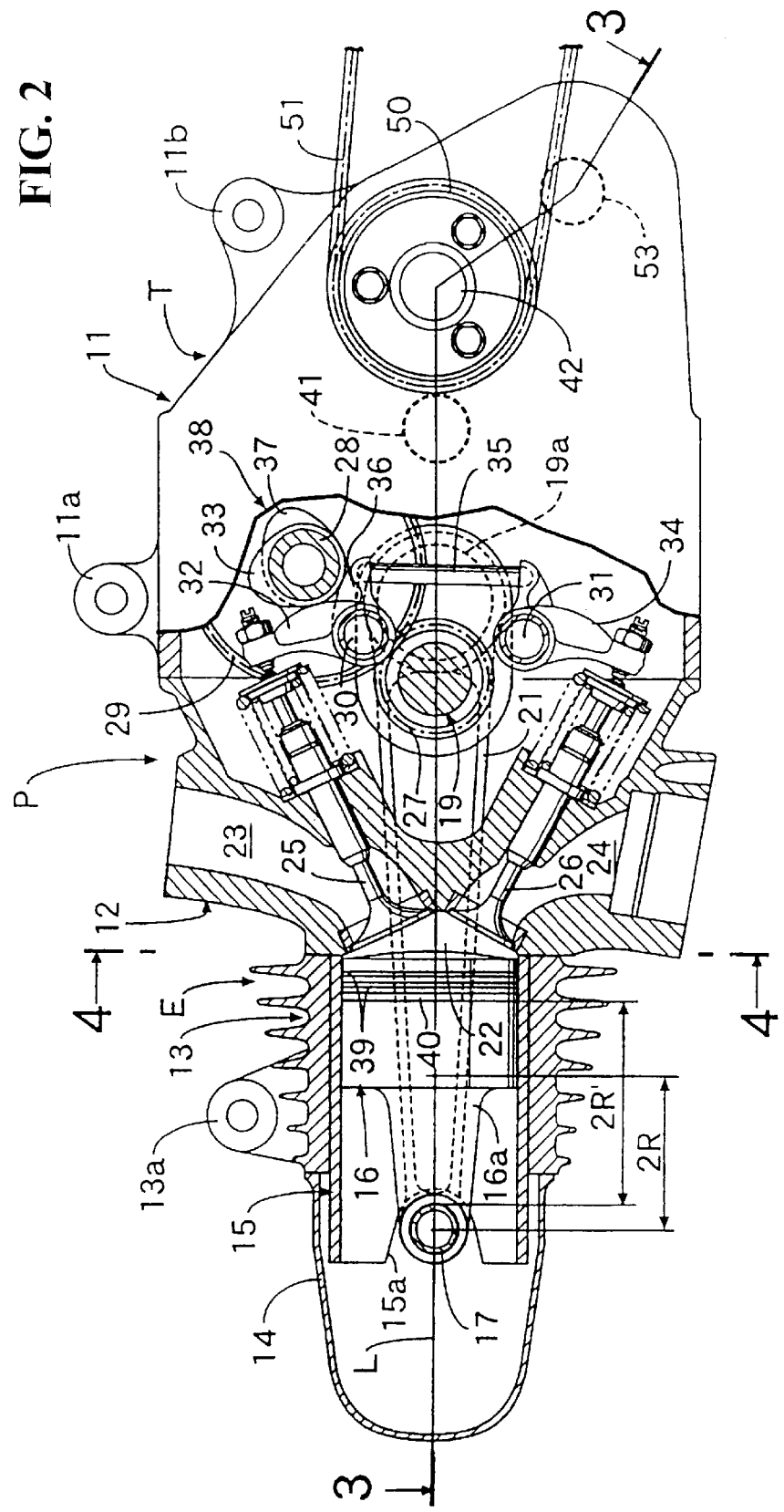
FIG. 2 is a side view of the power unit of the motorcycle, with parts partially cutaway.
Figure 3:
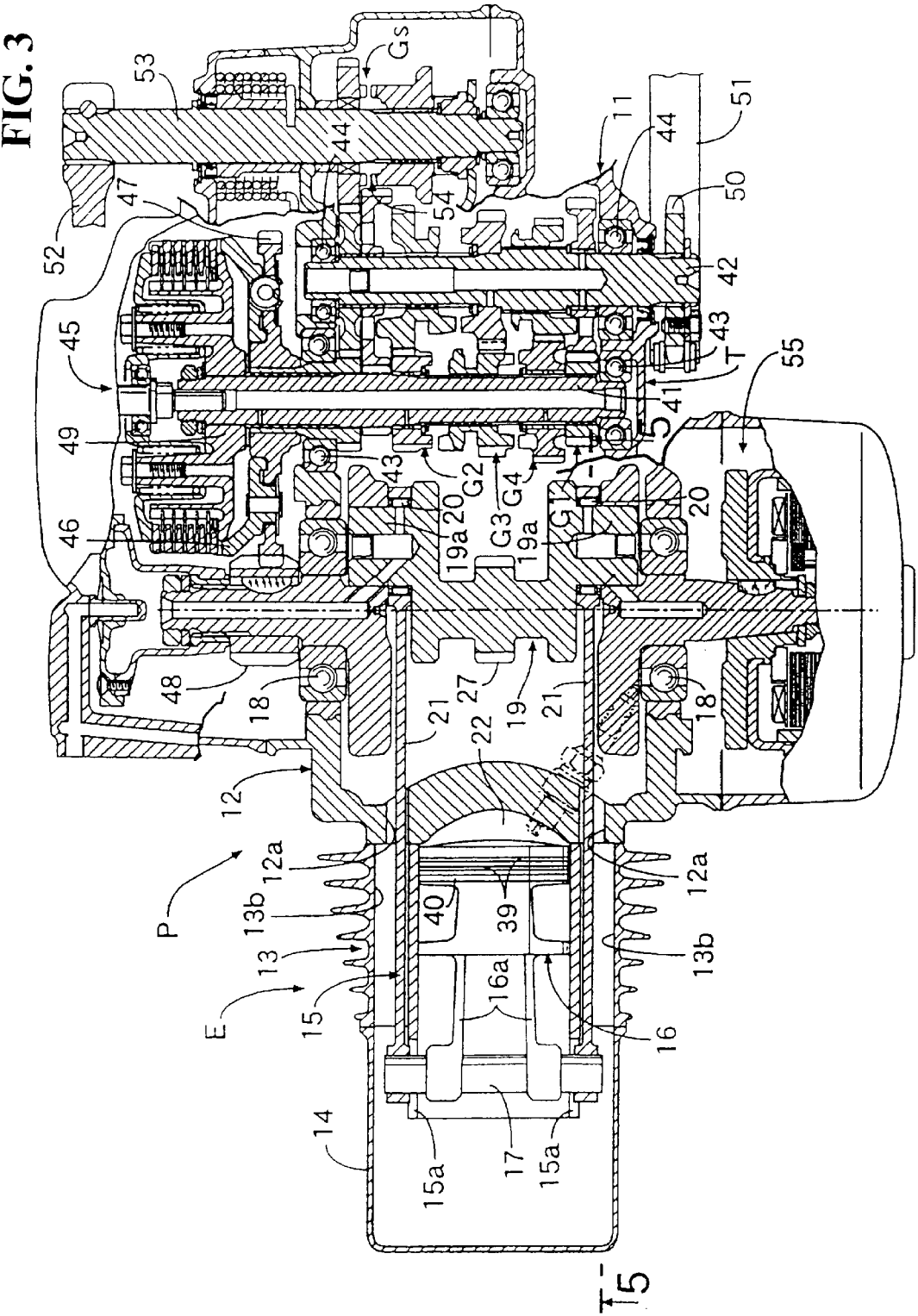
FIG. 3 is a sectional view taken on line 3—3 of FIG. 2.
Figure 4:
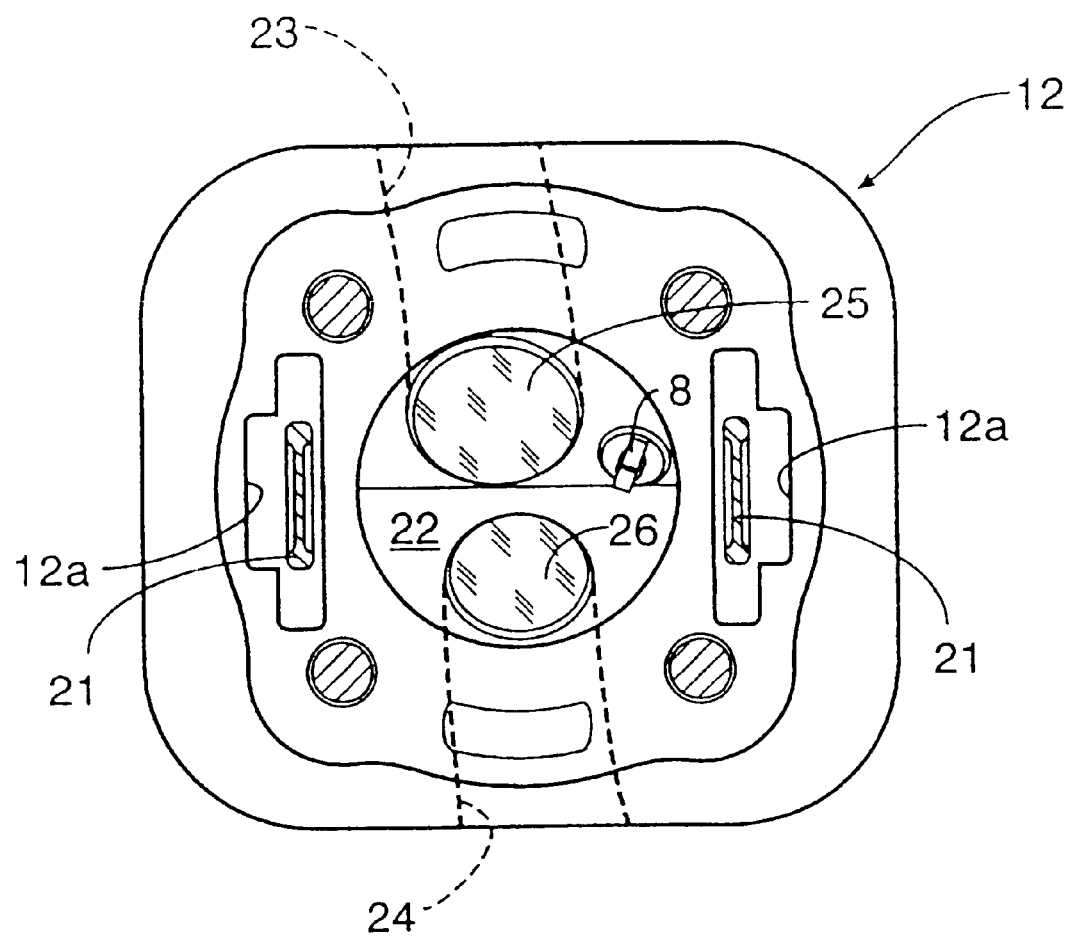
FIG. 4 is a sectional view taken on line 4—4 of FIG. 2.
Figure 5:
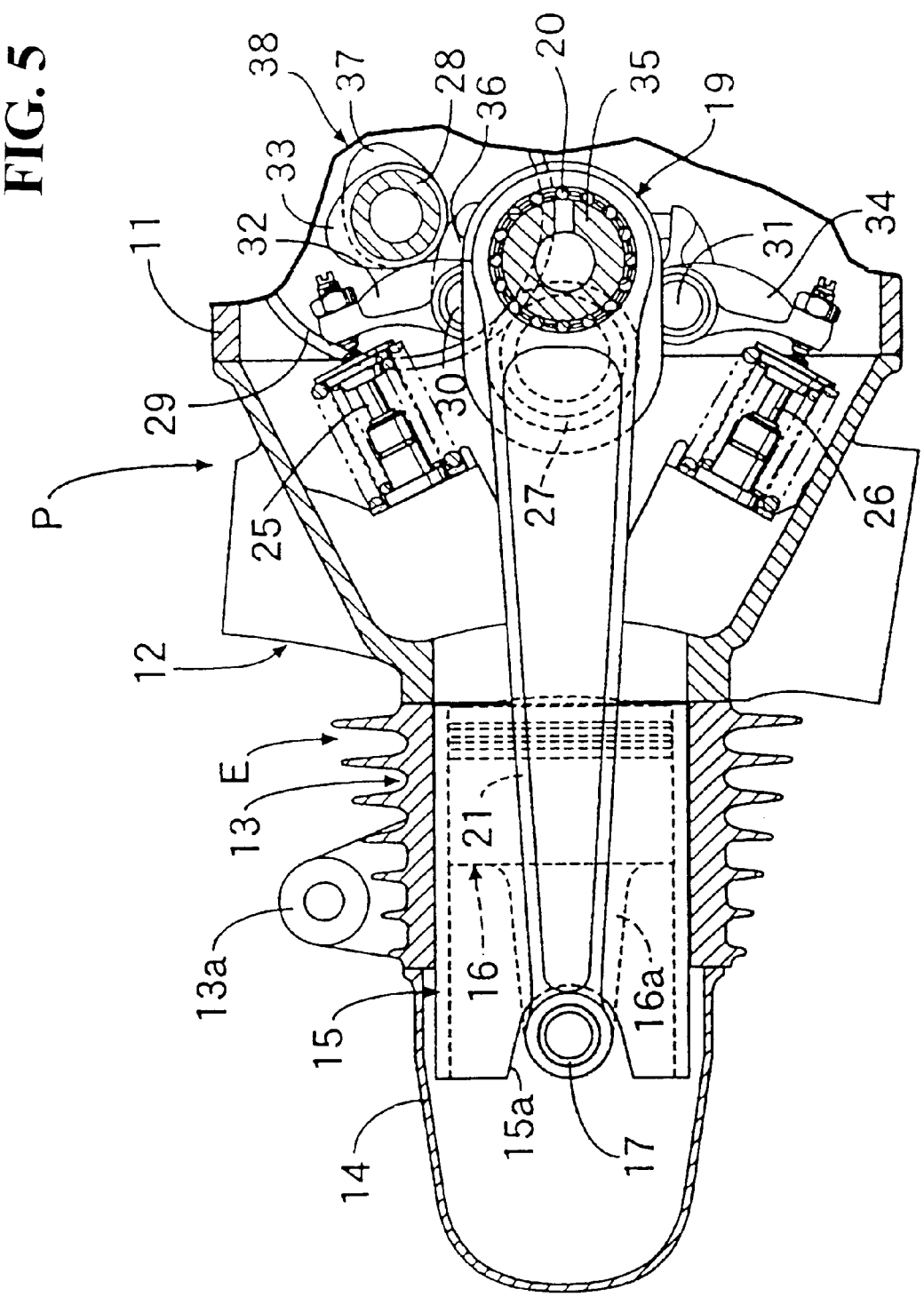
FIG. 5 is a sectional view taken on line 5—5 of FIG. 3 illustrating a state where a piston is located at a top dead center position.
Figure 6:
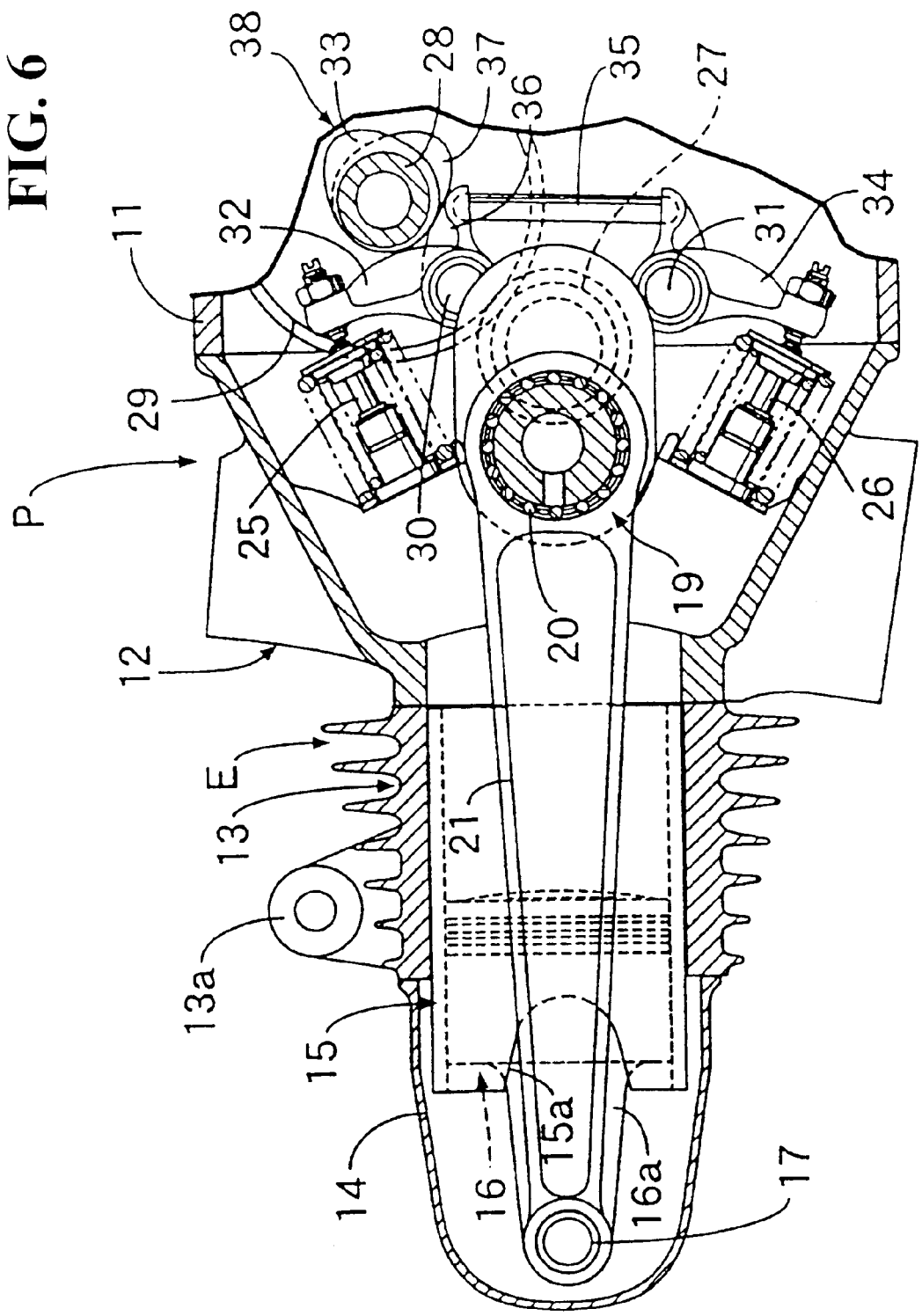
FIG. 6 is a view, similar to FIG. 5 illustrating a state where the piston is located at a bottom dead center position.
Figure 7:
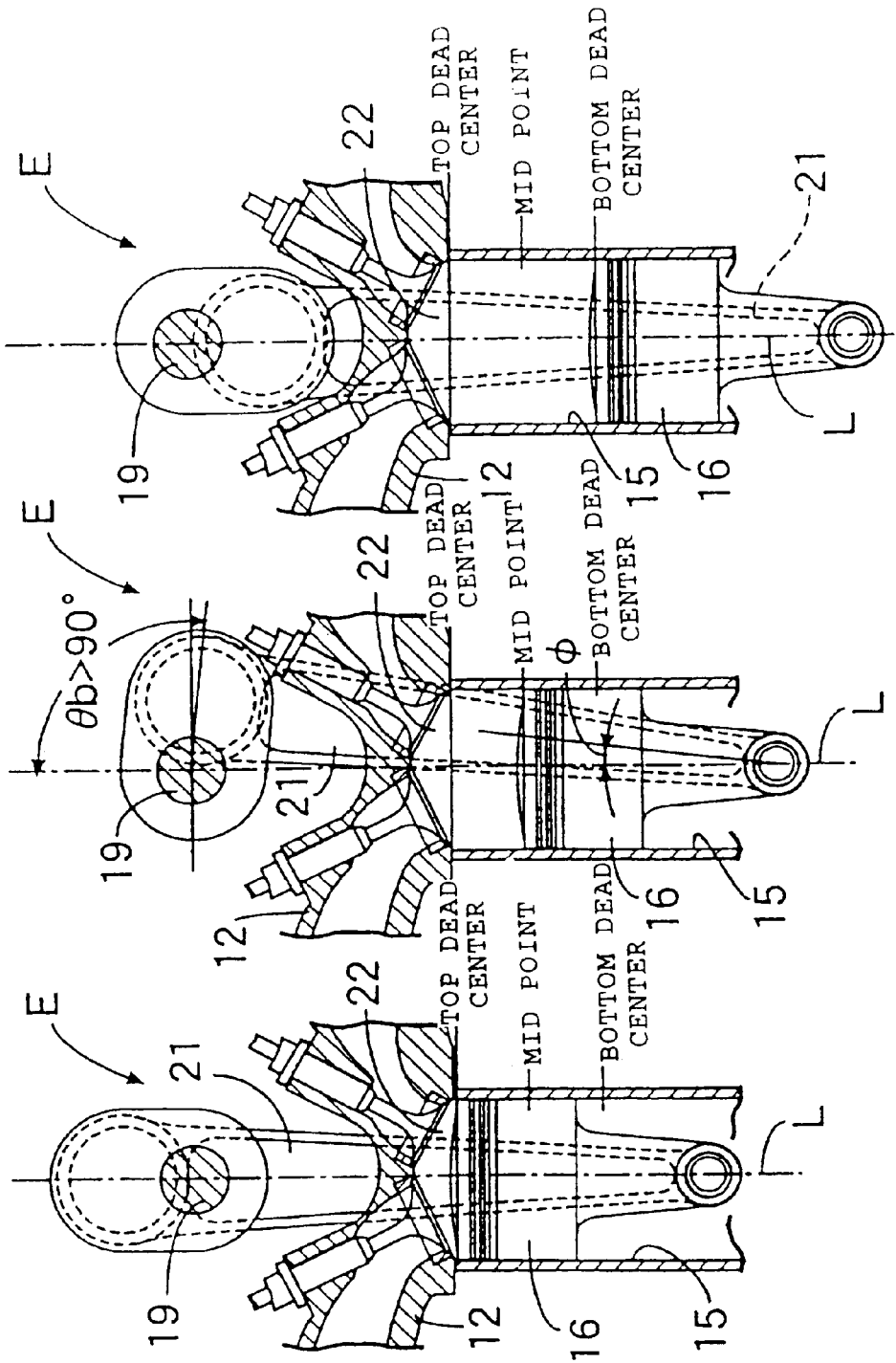
FIGS. 7(A) to 7(C) are views illustrating a function of an internal combustion engine of the present invention.

As is apparent from FIGS. 2 to 6, the power unit P has an outer structure including a mission case 11, a cylinder head 12 fastened to a front surface of the mission case 11, a cylinder block 13 fastened to a front surface of the cylinder head 12, and a cover 14 fastened to a front surface of the cylinder block 13. A mounting bracket 13a provided on an upper surface of the cylinder block 13 and two mounting brackets 11a provided on an upper surface of the mission case 11 are supported by the mounting brackets 2 and 3 (see FIG. 1) of the body frame 1 of the motorcycle. A piston 16 is slidably fitted in a cylinder 15 supported in the cylinder block 13. Two leg portions 16a are formed integrally with the piston 16 in such a manner as to project forwardly therefrom. A piston pin 17 is supported at front ends of the two leg portions 16a. Two U-shaped cutouts 15a are provided at a front end of the cylinder 15 in order to avoid interference of the piston pin 17 with the cylinder 15 when the piston 16 is located at a top dead center position, as shown in FIG. 2.

A crankshaft 19 is supported at a mating plane between the cylinder head 12 and the mission case 11 via a pair of ball bearings 18. The crankshaft 19 includes a pair of crank pins 19a. Large end portions of a pair of connecting rods 21 are supported on the crank pins 19a by means of two needle bearings 20. The pair of connecting rods 21 pass through two openings 12a of the cylinder head 12 and two openings 13b of the cylinder block 13. The other ends of the pair of connecting rods 21, which have passed through the above openings 12a and 13b, are connected to opposite ends of the piston pin 17.

A combustion chamber 22 is formed in the cylinder head 12 in such a manner as to face to a top surface of the piston 16. An intake port 23 extending upwardly from the combustion chamber 22 and an exhaust port 24 extending downwardly from the combustion chamber 22 are respectively opened/closed with an intake valve 25 and an exhaust valve 26 which are disposed in a V-shape. A drive cam gear 27 is integrally formed on a central portion of the crankshaft 19. The drive cam gear 27 is supported between the pair of crank pins 19a. A driven cam gear 29 is fixed to a cam shaft 28 supported by the mission case 11. The cam gear 29 is meshed with the drive cam gear 27. A carburetor 5 and an air cleaner 6 are connected to an upstream side of an intake pipe 4 extending upwardly from the intake port 23. An exhaust pipe 7 is connected to the exhaust port 24 (see FIG. 1). An ignition plug 8 is mounted in the combustion chamber 22 in such a manner as to not interfere with the intake valve 25 and the exhaust valve 26.

An intake rocker shaft 30 and an exhaust rocker shaft 31 are supported by the mission case 11. An intake rocker arm 32 slidably supported by the intake rocker shaft 30 is brought into contact with an intake cam 33 fixed to the cam shaft 28 and a stem end of the intake valve 25. An intermediate portion of an L-shaped driven exhaust rocker arm 34 is swingably supported on the exhaust rocker shaft 31. One end of the driven exhaust rocker arm 34 is brought into contact with a stem end of the exhaust valve 26. The other end of the driven exhaust rocker arm 34 is connected to one end of a coupling rod 35. A drive exhaust rocker arm 36 is swingably supported on the intake rocker shaft 30 in such a manner as to be independent from the intake rocker arm 32. An exhaust cam 37 fixed to the cam shaft 28 is brought into contact with the drive exhaust rocker arm 36. The other end of the coupling rod 35 is connected to the drive exhaust rocker arm 36.

The number of teeth of the drive cam gear 27 is set to half of the number of teeth of the driven cam gear 29, so that the cam shaft 28 is rotated at a rotational number half that of the crankshaft 19. The rotation of the cam shaft 28 is transmitted to the intake valve 25 via the intake cam 33 and the intake rocker arm 32, so that the intake valve 25 is driven to be opened one time per two turns of the crankshaft 19. The rotation of the cam shaft 28 is transmitted to the exhaust valve 26 via the exhaust cam 37, the drive exhaust rocker arm 36, the coupling rod 35, and the driven exhaust rocker arm 34, so that the exhaust valve 26 is driven to be opened one time per two turns of the crankshaft 19.

As is apparent from FIG. 2, the piston 16 has two upper side compression rings 39 and one lower side oil ring 40. A distance 2R' between a lower end of the lower side oil ring 40 and an upper end of the piston pin 17 is set to be larger than a stroke 2R of the piston 16 between the upper dead center and the bottom dead center positions. As a result, when the piston 16 is moved from the top dead center position shown in FIG. 2 to the bottom dead center position shown in FIG. 6, it is possible to prevent the oil ring 40 from being removed from the lower end of the cylinder 15 i.e., upper ends of the cutouts 15a which are formed in the cylinder 15 for allowing the piston pin 17 to be fitted therein.

The transmission T includes a main shaft 41 and a counter shaft 42. The main shaft 41 is supported on the mission case 11 via a pair of ball bearings 43. The counter shaft 42 is supported on the mission case 11 via a pair of ball bearings 44. A transmission clutch 45 is provided at a right end of the main shaft 41. A driven gear 47 is provided on a clutch outer 46 of the transmission clutch 45. The driven gear 47 is meshed with a drive gear 48 provided on the crankshaft 19. A clutch inner 49 of the transmission clutch 45 is fixed to the main shaft 41.

A first-speed gear train G1 for establishing a first-speed gear shift stage, a second-speed gear train G2 for establishing a second-speed gear shift stage, a third-speed gear train G3 for establishing a third-speed gear shift stage, and a fourth-speed gear train G4 for establishing a fourth-speed gear shift stage are provided between the main shaft 41 and the counter shaft 42. A drive sprocket 50 is provided at a left end of the counter shaft 42. The drive sprocket 50 is connected to a driven sprocket (not shown) for a rear wheel via an endless chain 51. Rotation of a kick shaft 53 connected to a kick pedal 52 for starting the engine E is transmitted to the crankshaft 19 via a dog clutch 54 provided on the kick shaft 53, the kick shaft 53, a starting gear train Gs provided on both the counter shaft 42 and the main shaft 41, the transmission clutch 45, the driven gear 47, and the drive gear 48. A generator 55 is provided at a left end of the crankshaft 19.

Rotation of the crankshaft 19 of the engine E is thus transmitted to the rear wheel via the following route: drive gear 48 provided on crankshaft 19→driven gear 47→transmission clutch 45→main shaft 41→any one of first-speed gear train G1 to fourth-speed gear train G4→counter shaft 42→drive sprocket 50→endless chain 51→driven sprocket (not shown).

A function of the internal combustion engine E will be described below.

FIGS. 7(A) to 7(C) typically show the internal combustion engine E according to this embodiment, which views are similar to FIGS. 9(A) to 9(C) showing the background art internal combustion engine.

The internal combustion engine E according to this embodiment includes the cylinder 15, the piston 16 slidably fitted in the cylinder 15, the cylinder head 12 connected to the cylinder 15, the combustion chamber 22 formed on an upper plane of the cylinder head 12 in such a manner as to face to the piston 16, the crankshaft 19, and the connecting rods 21 for connecting the piston 16 to the crankshaft 19. The cylinder head 12 is disposed between the piston 16 and the crankshaft 19.

FIG. 7(A) illustrates a state where the piston 16 is located at a top dead center position. In this state, a crank angle θ is 0°. FIG. 7(C) illustrates a state where the piston 16 is located at a bottom dead center postion. In this state, the crank angle is 180°. FIG. 7(B) illustrates a state where the piston 16 is located at a mid point between the top dead center and the bottom dead center postions. In this state, the crank angle θ is not 90°, but an angle θb larger than 90°. The reason for this is the fact that at each of the top dead center and the bottom dead center postitions, both of the connecting rods 21 are located on the cylinder axial line L. However, at the mid point, both of the connecting rods 21 are inclined by an angle φ with respect to the cylinder axial line L.

Figure 8:
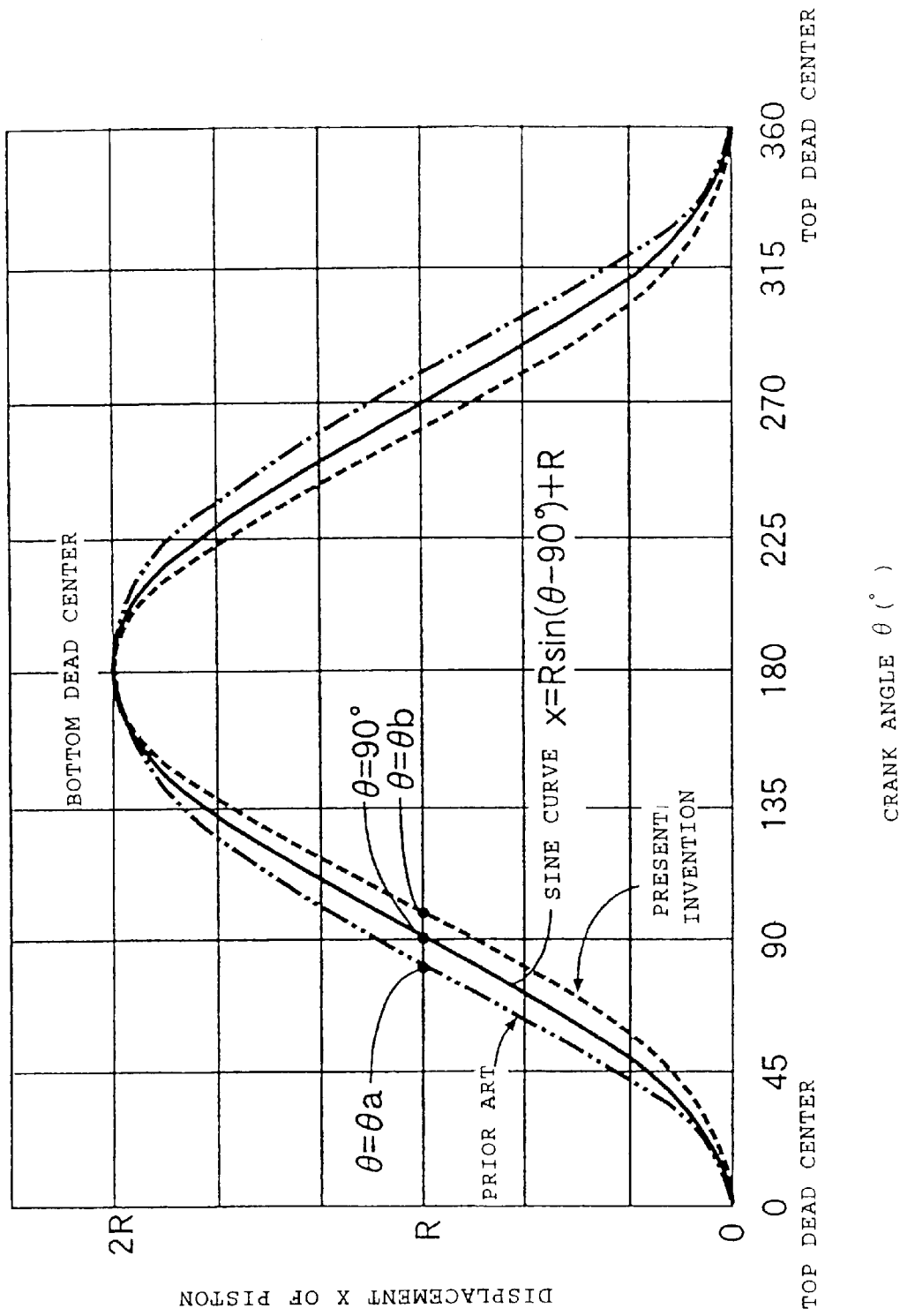
FIG. 8 is a graph showing a relationship between a crank angle θ and a displacement x of a piston.

Referring to FIG. 8, a relationship between the crank angle θ from the top dead center position and a displacement x of the piston 16 from the top dead center position is shown by a broken line. In the figure, a stroke of the piston 16 between the top dead center and the bottom dead center is set to 2R (R: crank radius). As described with reference to FIG. 7(B), when the piston 16 is located at the mid point between the top dead center and the bottom dead center positions, where the displacement is R, the crank angle θ becomes the angle θb larger than 90°. On the other hand, in the solid sine curve, when the piston 16 is located at the mid point between the top dead center and the bottom center positions, the crank angle θ becomes 90°.

In this way, according to the internal combustion engine E in this embodiment, it becomes apparent that the line (shown by the broken line) showing the relationship between the crank angle θ and the displacement x of the piston 16 is positioned under the solid sine curve, and a relationship of x<R sin (θ−90°)+R is established. This means that when the piston 16 is moved down from the top dead center position in an expansion stroke, a ratio of an increased amount of the displacement x of the piston 16 to an increased amount of the crank angle θ is smaller than the characteristic shown by the solid sine curve.

As described above, to increase the thermal efficiency of the internal combustion engine E, it may be desirable to increase the degree of constant volume of a fuel-air mixture at the time of combustion. To be more specific, when the piston 16 is moved down from the top dead center position in the expansion stroke, as the ratio of an increased amount of the volume of the combustion chamber 22 to an increased amount of the crank angle θ becomes smaller, the degree of constant volume becomes higher, with a result that the thermal efficiency is improved. As is apparent from an expansion stroke portion in which the crank angle θ is in the range of 0 to 180° in FIG. 8, the displacement x of the piston 16 from the top dead center position of the internal combustion engine E in this embodiment, which is shown by the broken line, is smaller than the displacement x of the piston 02 of the prior art internal combustion engine E, which is shown by a chain line. Accordingly, the degree of constant volume in the expansion stroke of the internal combustion engine E in this embodiment is increased and thereby the thermal efficiency is increased.

In the expansion stroke in which the largest load is applied to the connecting rods 21, since the piston 16 is moved in the direction where the piston 16 is separated apart from the crankshaft 19, a tensile load is applied to the connecting rods 21. It is noted that a compressive load is applied to the connecting rod in the background art internal combustion engine E. As compared with the configuration of the connecting rod to which a compressive load is applied, the configuration of the connecting rods 21 to which a tensile load is applied is advantageous in terms of strength. More specifically, it is possible to reduce the weight of the connecting rods 21 by thinning them.

According to this embodiment, one connecting rod used in the background art internal combustion engine is replaced with a pair of connecting rods 21. The connecting rods 21 are made to pass through spaces on both sides of the piston 16 and are connected to both the axial end sides of the crankshaft 19. Accordingly, it is possible to improve durability against wear by preventing an unbalanced load from being applied to the piston 16. Furthermore, since the leg portions 16a project from the piston 16 in the direction where the leg portions 16a are separated apart from the crankshaft 19 and the piston pin 17 is provided at the leading ends of the leg portions 16a, the total length of the connecting rods 21 becomes longer than that in the prior at internal combustion engine E. As a result, a swing angle φ of the connecting rods 21 from the cylinder axial line L becomes smaller, so that it is possible to reduce a side thrust applied to the piston 16 and hence to improve the durability of the piston 16 against wear.

Since the valve mechanism 38 and the crankshaft 19 are disposed in a space between the intake valve 25 and the exhaust valve 26 which are disposed in a V-shape, a power transmission system from the crankshaft 19 to the cam shaft 28 can be established only by two gears, i.e., the drive cam gear 27 and the driven cam gear 29. As a result, it is possible to eliminate the need for a timing chain and a timing belt which have been required in the prior art internal combustion engine E and hence to reduce the number of parts, and also to reduce the height (dimension in the direction along the cylinder axial line L) of the internal combustion engine E.

While the embodiment of the present invention has been described in detail, such description is for illustrative purposes only, and it is to be understood that various changes in design may be made without departing from the scope of the present invention.

For example, the embodiment has been described by way of the internal combustion engine E used for a power unit P of a motorcycle; however, the present invention can be also applied to internal combustion engines of any other type such as a multi-cylinder engine. While the internal combustion engine E in the embodiment has been described as a four-cycle/single-cylinder internal combustion engine E, the present invention can be applied to two-cycle internal combustion engines.

As described above, according to the first aspect of the present invention, a cylinder head in which a combustion chamber is defined is disposed between a piston and a crankshaft in an internal combustion engine. As compared with a background art internal combustion engine in which a combustion chamber is disposed opposite to a crankshaft with a piston located therebetween, a ratio of an increased amount of volume of the combustion chamber to an increased amount of a crank angle of the piston from the top dead center position can be suppressed at a small value. As a result, it is possible to increase the degree of constant volume of a fuel-air mixture at the time of combustion and hence to increase a thermal efficiency of the internal combustion engine. Furthermore, since a tensile load is applied to the connecting rod in an expansion stroke, it is not required to take buckling into account as compared with the background art internal combustion engine in which a compressive load is applied to the connecting rod. As a result, it is possible to lower the strength of the connecting rod and hence to reduce the weight thereof.

According to the second aspect of the present invention, a valve mechanism and a crankshaft are disposed between an intake valve and an exhaust valve provided in a cylinder head in such a manner as to be opened in a V-shape. Accordingly, it is possible not only to simplify a power transmission route from the crankshaft to the valve mechanism by making the crankshaft and the valve mechanism closer to each other but also to lower the total height of the internal combustion engine.

According to the third aspect of the present invention, a pair of connecting rods are disposed on both axial end sides of a crankshaft in such a manner as to hold a piston therebetween. Accordingly, it is possible to prevent an unbalanced load from being applied to the piston while avoiding interference of the connecting rods with the piston.

According to the fourth aspect of the present invention, where x is a displacement of a piston moved toward a bottom dead center position from a top dead center position taken as a reference point, θ is a crank angle from the top dead center position, and R is a crank radius, the values of x, θ, and R satisfy the equation x<R sin (θ−90°)+R. Accordingly, a ratio of an increased amount of a volume of a combustion chamber to an increased amount of a crank angle can be suppressed at a small value. This makes it possible to increase the degree of constant volume of a fuel-air mixture at the time of combustion and hence to increase thermal efficiency.

According to the fifth aspect of the present invention, a cylinder head in which a combustion chamber is defined is disposed between a piston and a crankshaft. Accordingly, a tensile load is applied to the connecting rod during the expansion stroke. Accordingly, it is not required to take buckling into account as compared with the background art internal combustion engine in which a compressive load is applied to a connecting rod. As a result, it is possible to lower the strength of the connecting rod and hence to reduce the weight thereof. Furthermore, a distance between a lower end of a piston ring and an upper end of a piston pin is larger than a stoke of the piston. Accordingly, the piston ring is not removed from the lower end of the cylinder when the piston reaches the bottom dead center position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine, comprising:
   a cylinder;
   a crankshaft;
   a piston slidably fitted in said cylinder;
   at least one connecting rod, said piston being connected to said crankshaft via said at least one connecting rod on a side of said piston rod opposite to said crankshaft; and
   a cylinder head in which a combustion chamber is defined, said cylinder head being disposed between said piston and said crankshaft.

2. The internal combustion engine according to claim 1, wherein an intake valve and an exhaust valve are provided in said cylinder head in such a manner as to be open in a V-shape, and a valve mechanism and said crankshaft are disposed between said intake valve and said exhaust valve.

3. The internal combustion engine according to claim 1, wherein a pair of said at least one connecting rod are disposed on opposite axial end sides of said crankshaft, respectively, and said piston is located between said pair of connecting rods.

4. The internal combustion engine according to claim 1, wherein said cylinder is mounted in a cylinder block and at least one passageway is formed through said cylinder block between said cylinder and said cylinder block for passage of said at least one connecting rod, respectively.

5. The internal combustion engine according to claim 4, wherein at least one passageway is formed in said cylinder head corresponding to each of said at least one passageway in said cylinder block for passage of said at least one connecting rod, respectively.

6. The internal combustion engine according to claim 1, wherein said at least one connecting rod is located at a position away from an axis of said cylinder.

7. An internal combustion engine, comprising:
   a cylinder;
   a crankshaft;
   a piston slidably fitted in said cylinder;
   at least one connecting rod, said piston being connected to said crankshaft via said at least one connecting rod; and
   a cylinder head in which a combustion chamber is defined, said cylinder head being disposed between said piston and said crankshaft, wherein
   values of x, θ, and R satisfy the following equation:

$x < R \sin(\theta - 90°) + R$ where x is a displacement of said piston being moved toward a bottom dead center position from a top dead center position taken as a reference point, θ is a crank angle from the top dead center position, and R is a crank radius.

8. The internal combustion engine according to claim 7, wherein an intake valve and an exhaust valve are provided in said cylinder head in such a manner as to be open in a V-shape, and a valve mechanism and said crankshaft are disposed between said intake valve and said exhaust valve.

9. The internal combustion engine according to claim 7, wherein a pair of said at least one connecting rod are disposed on opposite axial end sides of said crankshaft, respectively, and said piston is located between said pair of connecting rods.

10. The internal combustion engine according to claim 7, wherein said cylinder is mounted in a cylinder block and at least one passageway is formed through said cylinder block between said cylinder and said cylinder block for passage of said at least one connecting rod, respectively.

11. The internal combustion engine according to claim 10, wherein at least one passageway is formed in said cylinder head corresponding to each of said at least one passageway in said cylinder block for passage of said at least one connecting rod, respectively.

12. An internal combustion engine, comprising:
   a cylinder block, said cylinder block including at least one cylinder therein;
   a crankshaft;
   at least one piston slidably fitted in said at least one cylinder, respectively;
   at least one connecting rod, said at least one piston being connected to said crankshaft via said at least one connecting rod; and
   a cylinder head in which a combustion chamber is defined, wherein
   values of x, θ, and R satisfy the following equation:

$x < R \sin(\theta - 90°) + R$ where x is a displacement of said at least one piston being moved toward a bottom dead center position from a top dead center position taken as a reference point, θ is a crank angle from the top dead center position, and R is a crank radius.

13. The internal combustion engine according to claim 12, wherein an intake valve and an exhaust valve are provided in said cylinder head in such a manner as to be open in a V-shape, and a valve mechanism and said crankshaft are disposed between said intake valve and said exhaust valve.

14. The internal combustion engine according to claim 12, wherein there is only a single piston and a pair of said at least one connecting rod are disposed on opposite axial end sides of said crankshaft, respectively, and said piston is located between said pair of connecting rods.

15. The internal combustion engine according to claim 12, wherein at least one passageway is formed through said cylinder block between said at least one cylinder and said cylinder block for passage of said at least one connecting rod, respectively.

16. The internal combustion engine according to claim 15, wherein at least one passageway is formed in said cylinder head corresponding to each of said at least one passageway in said cylinder block for passage of said at least one connecting rod, respectively.

17. The internal combustion engine according to claim 12, wherein a pair of said at least one connecting rod is provided for each of said at least one piston, and said at least one piston is located between said pair of connecting rods, respectively.

18. A reciprocating internal combustion engine in which a stroke volume is not changed during a cycle, wherein values of x, θ, and R satisfy the following equation:

$$x < R \sin(\theta - 90°) + R$$

where x is a displacement of a piston being moved toward a bottom dead center position from a top dead center position taken as a reference point, θ is a crank angle from the top dead center position, and R is a crank radius.

19. The internal combustion engine according to claim 18, wherein a cylinder head in which a combustion chamber is defined is disposed between a piston and a crankshaft, and a distance between a lower end of a piston ring and an upper end of a piston pin is larger than a stroke of said piston.

20. An internal combustion engine, comprising:
   a cylinder;
   a crankshaft;
   a piston slidably fitted in said cylinder;
   at least one connecting rod, said piston being connected to said crankshaft via said at least one connecting rod; and
   a cylinder head in which a combustion chamber is defined, said cylinder head being disposed between said piston and said crankshaft,
   wherein a pair of said at least one connecting rod are disposed on opposite axial end sides of said crankshaft, respectively, and said piston is located between said pair of connecting rods.

21. An internal combustion engine, comprising:
   a cylinder;
   a crankshaft;
   a piston slidably fitted in said cylinder;
   at least one connecting rod, said piston being connected to said crankshaft via said at least one connecting rod; and
   a cylinder head in which a combustion chamber is defined, said cylinder head being disposed between said piston and said crankshaft,
   wherein said cylinder is mounted in a cylinder block and at least one passageway is formed through said cylinder block between said cylinder and said cylinder block for passage of said at least one connecting rod, respectively.

22. The internal combustion engine according to claim 21, wherein at least one passageway is formed in said cylinder head corresponding to each of said at least one passageway in said cylinder block for passage of said at least one connecting rod, respectively.

23. The internal combustion engine according to claim 21, wherein said at least one passageway overlaps with said piston.

* * * * *